United States Patent [19]
Haubs et al.

[11] Patent Number: 5,221,388
[45] Date of Patent: Jun. 22, 1993

[54] SELECTIVE SEALING OF DEFECTIVE GAS SEPARATION HOLLOW FIBERS

[75] Inventors: Michael Haubs, Chatham; Walter Hassinger, Annandale, both of N.J.

[73] Assignee: Hoechst Celanese Corp., Somerville, N.J.

[21] Appl. No.: 788,955

[22] Filed: Nov. 7, 1991

[51] Int. Cl.⁵ .................... B32B 35/00; B01D 71/56
[52] U.S. Cl. ............................... 156/94; 55/16; 55/158; 264/36; 427/140
[58] Field of Search ............... 156/94; 264/36, 85; 29/402.18; 55/158, 16; 210/500.63, 500.21, 321.6, 323.2, 232; 427/140

[56] References Cited

U.S. PATENT DOCUMENTS

| | | | |
|---|---|---|---|
| 3,499,062 | 3/1970 | Geary | 264/36 |
| 3,968,192 | 7/1976 | Hoffman | 264/36 |
| 4,170,695 | 10/1979 | Brown | 264/36 |
| 4,226,921 | 10/1980 | Tsang | 264/36 |
| 4,248,648 | 2/1981 | Kopp | 156/94 |
| 4,689,191 | 8/1987 | Beck | 264/261 |
| 4,954,144 | 9/1990 | Burgoyne | 55/16 |
| 4,955,993 | 9/1990 | Sanders | 55/158 |
| 5,034,024 | 7/1991 | Hayes | 55/16 |
| 5,084,073 | 1/1992 | Prasad | 55/158 |

FOREIGN PATENT DOCUMENTS 0135675  10/1979  Japan ..................... 264/36

Primary Examiner—Michael W. Ball
Assistant Examiner—Daniel J. Stemmer
Attorney, Agent, or Firm—Joseph H. Mazzarese

[57] ABSTRACT

A process for improving the gas separation efficiency of a bundle or module of hollow gas separation fibers by selectively sealing defective fibers without sealing good fibers through which a gas A passes significantly more readily than a gas B. At the beginning of this process the same atmosphere containing A and B is in the interior and at exterior surfaces of said fibers. A curable sealant is applied to a first open end of the fibers, the opposite end of the fibers is blocked, and the partial pressure of A at the exterior fiber surfaces is increased. The resulting pressure build-up inside the non-defective fibers prevents them from being penetrated significantly by the sealant. When the tip of the fibers is cut cleanly away, the good fibers are open but the defective fibers are plugged with sealant.

14 Claims, 1 Drawing Sheet

SELECTIVE SEALING OF DEFECTIVE GAS SEPARATION HOLLOW FIBERS

BACKGROUND OF THE INVENTION

This invention relates to the field of hollow fibers used for gas separation, and to the art of sealing defects in such fibers.

It is known in the art that certain materials, which may be in the form of hollow fibers, are more permeable to some gasses than to others. The relative permeability of gasses through a material or article, e.g. a hollow fiber, is often expressed as a separation factor or ratio, which is equal to the flux of one gas divided by the flux of the other gas through the same material, measured under identical conditions of temperature and pressure.

Hollow fibers made of selective materials may be used in gas separation applications. These fibers typically are in the form of hollow tubular structures, either in a linear or bent configuration; gasses may freely pass through the open ends, but may not pass as easily through the fiber walls. The open ends provide access to the hollow fiber interior.

Generally in hollow fiber separations, gasses are separated when they are forced by a pressure differential to pass through or along the fiber. If the fiber is selective for one gas over another, the former gas will pass more easily, and therefore in larger proportion, through the wall of the fiber; the less permeable gas will have a lesser tendency to penetrate the fiber wall. In this way, the more permeable gas may be concentrated on one side of the fiber wall while the less permeable gas is concentrated on the other side. The gas concentrated in the fiber interior can be removed through an open end of the fiber.

However, gas separation will not occur efficiently if the fiber is defective, i.e. has a leak or hole in the wall, because every gas will be able to pass easily through the hole. Since a hole provides virtually no resistance to gas flow, much more gas is likely to pass therethrough than to pass through the intact parts of the fiber wall. For these reasons, a fiber defect can reduce significantly the separation factor of the fiber, often to the point of making the fiber useless for gas separation. Furthermore, when fibers are bundled together as in a gas separation module a small percentage of defective fibers may greatly reduce the separation efficiency of the bundle as a whole because the defective fibers will have a much higher gas throughput than will the non-defective fibers.

It is difficult to avoid fiber defects completely, especially when a large number of fibers are being used. Therefore it is important to find some way to plug the leaks in bad fibers without closing the open ends of good fibers. A number of solutions to this problem have been tried.

U.S. Pat. No. 3,499,062 describes a method for repairing leaks in a fluid separation apparatus containing hollow filaments in which a high pressure is applied to the interior fibers, a low pressure is applied to the exterior fiber surfaces, and a solidifiable liquid is applied to one end of the fibers under a pressure intermediate between the other pressures. According to this reference, this method causes the liquid to be drawn into and seal the leaky fibers. The method is repeated to seal the other end of the fibers.

U.S. Pat. No. 3,968,192 describes a method for repairing leaky hollow fiber permeability separatory devices comprising a membrane in the form of hollow fibers having ends potted in tubesheet bodies and terminating in an accessible surface of said tubesheet. Each surface opening communicating with a leak is selectively plugged by applying heat and pressure in the immediate vicinity thereof.

U.S. Pat. No. 4,226,921 describes a method for selectively plugging broken fibers in tubesheet-hollow fiber assemblies. The open ends are covered with a curable and flowable sealant and a pressure differential is used to draw the sealant into the fibers. The resistance to compression of the gas in the unbroken fibers keeps the sealant from penetrating too deeply. The sealant is then diluted and another pressure differential used to expel sealant from the unbroken fibers.

U.S. Pat. No. 4,248,648 describes a method for repairing leaks in a hollow capillary fiber diffusion device containing a bundle of hollow fibers. The fibers are temporarily sealed at one end and a curable sealant is applied to the other end. Suction is then applied to the fiber exterior, causing sealant to flow into bad fibers.

SUMMARY OF THE INVENTION

The present invention is a method for improving the gas separation efficiency of a group of hollow gas separation fibers by selectively sealing defective fibers without sealing good fibers, the fibers comprising a material through which a gas A passes significantly more readily than a gas B. This method comprises applying a curable sealant to a first end of the fibers, blocking the opposite end of the fibers, and increasing the partial pressure of A at the exterior fiber surfaces. The partial pressure differential is maintained while the sealant cures. Preferably, the total exterior pressure remains constant throughout the process.

The good fibers will experience an increased internal pressure as more of gas A flow in through their walls but B cannot easily exit to balance the pressure; as a result, gas will bubble out of the first end, preventing the sealant from penetrating deeply into the good fibers. However, the defective fibers will not experience an internal pressure increase because both A and B may be exchanged freely through the holes in their walls; consequently, the sealant will penetrate the defective fibers by capillary action. Preferably, the fibers are positioned so that the sealant is placed on an upward facing end, allowing gravity to assist in the sealant penetration.

Any sealant that remains in the tip of the good fibers is removed by slicing off the fiber ends, leaving only the defective fibers plugged.

It is an object of the present invention to provide a method for selectively sealing defective hollow gas separation fibers.

It is also an object of this invention to provide a method for improving the gas separation efficiency of a bundle or module of hollow gas separation fibers.

Other objects and advantages of the present invention will be apparent to those skilled in the art from the following description and the appended claims.

DETAILED DESCRIPTION OF THE PREFERRED EMBODIMENTS

Figure 1:
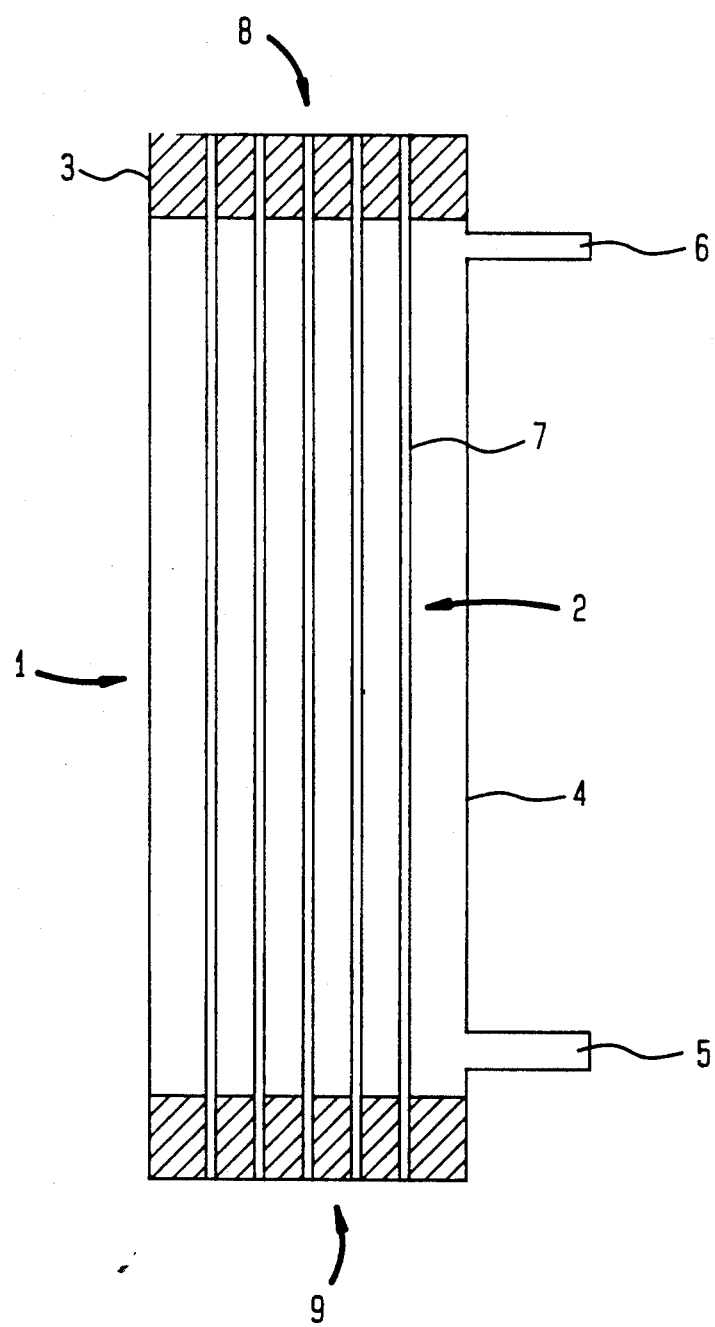
FIG. 1 depicts a typical hollow gas separation fiber module that may be treated according to the process of the present invention.

Many aspects of the present invention may be illustrated by reference to FIG. 1 which represents a typical hollow gas separation fiber module. The module 1 contains a number of hollow gas separation fibers 2 the ends of which are held together, but not blocked, by potting material 3. The fibers 2 are enclosed in module walls 4; gas exchange ports 5 and 6 provide access to the exterior surfaces 7 of the enclosed fibers 2.

In one preferred process according to the present invention, the hollow fibers 2 comprise a composition that selectively allows oxygen to pass through much more readily than nitrogen. At the start, all ends of the fibers 2 and the ports 5 and 6 are open to the atmosphere (about 78% nitrogen and about 21% oxygen by volume) so that all interior and exterior surfaces 7 of the fibers 2 are under the same partial pressure of both of these gasses. A fast curing liquid epoxy composition is applied to the upper end 8 of the module 1 coating the upper ends of the fibers 2. The lower end 9 is blocked so that no gas may pass through that end of the fibers 2.

Oxygen-rich air (about 40% $O_2$) is introduced through the lower port 5 and allowed to flow out of the upper port 6, raising the $O_2$ partial pressure, but not the total pressure, on the exterior surfaces 7 of the fibers 2. Since oxygen more readily penetrates through the fibers 2 than does nitrogen, the $O_2$ partial pressure of fibers 2 having no defects or holes will increase much faster than the $N_2$ partial pressure will decrease, causing an increase in total interior pressure in these fibers 2; this pressure pushes up on the epoxy composition and typically results in gas bubbling therethrough, preventing the epoxy from penetrating downward. Defective fibers 2, however, will have holes allowing nitrogen to escape, preventing pressure from building up therein; in these fibers 2 the epoxy will penetrate downward by capillary action and gravity.

The oxygen flow is maintained while the epoxy is allowed to cure. Then the end of the fibers 2 is sliced off with a razor blade so that any epoxy blocking the ends of the good fibers 2 is removed; however, this slice is thin enough that the deeper epoxy plugs in the defective fibers 2 are not eliminated.

The process optionally may be repeated to seal the fibers 2 at the other end 9 of the module 1. Alternatively, once the first end is sealed selectively according to the present invention the other end may be sealed simply by applying a weak vacuum to the exterior of the fibers to draw sealant into the other end of the fibers that were sealed at the first end; the good fibers will not have sealant drawn into the other end since the first end is open, i.e., no vacuum can build up inside these fibers. In this way, the other end of the defective fibers may be sealed selectively, if desired.

The concentration and flow rate of the oxygen-rich gas may both vary, as long as a sufficient oxygen partial pressure differential is maintained between the interior and exterior of the fibers to keep the sealant out of the good fibers. The optimal flow rate generally is that needed to maintain the exterior of the fibers at the elevated oxygen concentration; this rate depends mainly on the physical dimensions of the module and the permeation rate, P/l, of the membrane, where P = the permeability coefficient and l = the effective thickness of the membrane. If the sealant is not very fast curing, higher concentrations may be needed toward the end of the procedure to compensate for the increase in oxygen partial pressure within the fiber that will result from oxygen diffusing through the fiber walls, especially if the fibers have a very small interior volume. Typically, gas having an oxygen content in the approximate range of 40% to 60% is suitable in the preferred embodiment described above, although concentrations as high as 100% may be used.

Where a fiber module initially has both ends blocked, as is common for new modules, one may open both ends to start with a fully open module. However, it would be more efficient to slice open the first end, leaving the second blocked until the selective sealing has been accomplished, since one end must be blocked anyway. Of course, eventually both ends must be opened so that the module may be used. These variations are considered equivalent and all are fully within the scope of the present invention.

Those skilled in the art will understand that the process of the present invention may be applied to a wide variety of hollow gas separation fibers regardless of the type, size, or thickness of the fibers, and regardless of the gasses separated by the fibers; as long as there are two gasses for which a fiber has a sufficient separation factor to make the process practicable, e.g. a separation factor of at least about 1.5 or greater, preferably about 2.0 or greater. The fibers need not be inside a module, nor in any particular shape, provided that it is possible to carry out the steps of the process. Appropriate gas flow rates and gas concentrations may be determined in each case without undue experimentation.

The sealant may be any known curable liquid or gel, or the like, that will serve to penetrate and seal the fibers in a reasonable time period. One preferred type of sealant in the practice of this invention is low viscosity, fast curing epoxy resin. The sealant curing time must not be so fast nor the viscosity of the sealant so great that the good and bad fibers will not be penetrated to significantly different depths. However, if the sealant cures too slowly the process may become undesirably time-consuming for commercial applications, and more importantly it may become difficult to maintain a partial pressure differential since the internal partial pressure of the fibers changes as gas flows in. The sealant must be low enough in viscosity to penetrate the bad fibers; the sealant viscosity that is needed will depend in part on the diameter of the hollow opening in the fiber, since penetration is easier in a wide channel than in a narrow one. Those skilled in the art will understand how to choose an appropriate sealant.

Any conventional method may be used to slice off the end of the fibers after the sealant cures, provided that the good fibers are left open and the defective fibers remain plugged. A clean cut, such as is provided by a sharp razor, prevents the fiber ends from being crushed, leaving the good fibers open. The cut must be made so that enough epoxy is removed to clear the good fibers but not so much that the bad fibers are reopened. It may be unnecessary to slice the end of the fibers if the majority of the good fibers are clear of sealant, but if a significant number are not clear the gas throughput will be reduced.

An important aspect of the present invention is that the fibers are sealed selectively based on their selectivity, and not on their permeability. Furthermore, fibers with relatively slight differences in selectivity may be differentiated. In methods that utilize permeability rather than selectivity to selectively seal fibers, fibers with minor defects having permeabilities close to that of the good fibers are not easily differentiated for selective sealing. The improved ability of the present method to differentiate such fibers makes it possible to achieve a higher overall selectivity or separation power in a fiber module; furthermore, one essentially may choose the selectivity of the module by how much of the fiber ends is sliced off - as progressively more of each end is sliced off more fibers will open, the additional fibers having progressively lower selectivities.

The following Examples are presented solely to further illustrate the present invention. However, the invention should not be construed to be limited to the embodiments illustrated or described herein.

EXAMPLE I

A hollow fiber gas separation module 27 cm long and 1 $cm^2$ in cross-section containing 400 hollow CELGARD ® fibers coated with SIXEF ™ -Durene polyimide, which is more permeable to oxygen than nitrogen. The coated fibers and the module containing them were made by conventional means. The oxygen and nitrogen fluxes through the fibers were measured separately with a flow meter using pure oxygen and pure nitrogen, respectively, at 20 psi and room temperature (about 25° C.). The measured oxygen flux was 1.02 ml/sec, while the nitrogen flux measured 0.294 ml/sec. The selectivity of the module calculated from these fluxes was 1.02/0.294=3.47.

To seal any defective fibers, and thereby improve the selectivity factor, the module was positioned vertically and 40% $O_2$ gas was purged through the module at a rate of 10 cc/min. After a few seconds, a layer of DEVCON ™ 2-Ton Epoxy, a fast curing, low viscosity epoxy resin, was applied to the upper end of the fibers and the $O_2$ flow rate was reduced to 2 cc/min. This flow was maintained for three minutes while the epoxy cured. Once the epoxy was dry, the gas flow was discontinued and about 2 mm of the end of the fiber was sliced away with a razor blade to remove any epoxy from the good fibers.

The ends of the fibers were then observed under a microscope and about 8% of them appeared to be sealed. The fluxes were remeasured and found to be 0.872 and 0.206 for a separation factor of 4.23, which approximates the intrinsic value (i.e., 4.3) for the coating material. This suggests that essentially all the defective fibers were sealed.

(CELGARD ® fiber is a microporous polypropylene hollow fiber made by Hoechst Celanese Corporation headquartered in Bridgewater, N.J. SIXEF ™ -Durene polyimide, another Hoechst Celanese product, is the polymerization product of 2,2-bis[3,4-dicarboxyphenyl] hexafluoropropane dianhydride and 2,3,5,6-tetramethylphenylene diamine monomers.)

EXAMPLE II

The procedure of Example I was repeated using a module of the same dimensions and containing 500 hollow fibers of the same type as in Example I. The measured oxygen/nitrogen selectivity factor increased, from 1.30/0.339=3.84 to 1.14/0.270=4.22, as a result of the hollow fiber sealing procedure.

Many variations of the present invention will occur to those skilled in the art. The present invention is not limited to the embodiments illustrated and described herein, but encompasses all the subject matter within the scope of the appended claims.

We claim:
1. A process for selectively sealing defective hollow gas separation fibers in a group of fibers containing both defective and non-defective fibers, said fibers each having a first open end providing access to the hollow interior thereof and a second blocked end, said fibers comprising a material through which a gas A is more permeable than a gas B, said process comprising:
   applying a curable sealant to said first end of said fibers, said sealant capable of flowing into and sealing said interior of said defective hollow fibers; and,
   maintaining a higher partial pressure of A, but not a higher total gas pressure, at the exterior fiber surfaces than in said interior of said non-defective fibers while said sealant cures so that said sealant flows selectively into said defective fibers but flows into said non-defective fibers less deeply or not at a.
2. The process of claim 1 further comprising slicing off said first end after said sealant has cured, wherein said slicing removes enough of said non-defective fibers that no sealant remains therein but does not remove all of said sealant from said defective fibers, leaving said defective fibers sealed and said non-defective fibers open at said first end.
3. The process of claim 2 wherein said sealant is an epoxy resin.
4. The process of claim 1 wherein said sealant is an epoxy resin.
5. The process of claim 1 wherein said fiber comprises a polyimide that is more permeable to oxygen than to nitrogen.
6. The process of claim 1 wherein said fibers are contained in a module having a gas port that allows communication between exterior surfaces of said fibers and the exterior of the module, and having said first ends and said second ends of said fibers potted so that said first and second ends protrude through the potting material to allow open communication between said fiber interior and the exterior of the module.
7. The process of claim 6 wherein said gas A is oxygen and said gas B is nitrogen.
8. The process of claim 1 wherein said gas A is oxygen and said gas B is nitrogen.
9. The process of claim 1 further comprising heating said sealant after it has flowed into said fiber interior to facilitate curing.
10. A process for selectively sealing defective hollow gas separation fibers in a group of fibers containing both defective and non-defective fibers, said fibers each having an open first end providing access to the hollow interior thereof and a closed second end, said fibers comprising a polymer through which oxygen is more permeable than nitrogen, said process comprising:
    applying a sealant comprising an epoxy resin to said first end of said fibers, said sealant capable of flowing into and sealing said interior of said defective hollow fibers; and,
    maintaining a higher partial pressure of oxygen, but not a higher total gas pressure, at the exterior fiber surfaces than in said interior of said non-defective fibers while said sealant cures so that oxygen diffusion into said fibers selectively causes a pressure increase in said non-defective fibers that partially or completely prevents said sealant from flowing into said non-defective fibers as it flows into said defective fibers.

11. The process of claim 10 wherein said fibers are positioned so that said first end is higher than said second end to facilitate sealant flow into said interior of said fibers.

12. The process of claim 10 further comprising heating said sealant after it has flowed into said fiber interior to facilitate curing.

13. The process of claim 10 wherein said polymer is a polyimide.

14. The process of claim 14 wherein said polyimide is the polymerization product of 2,2-bis hexafluoropropane dianhydride and 2,3,5,6-tetramethylphenylene diamine monomers.

* * * * *